(No Model.)
T. J. McGEE.
AXLE BEARING.
No. 481,911. Patented Aug. 30, 1892.
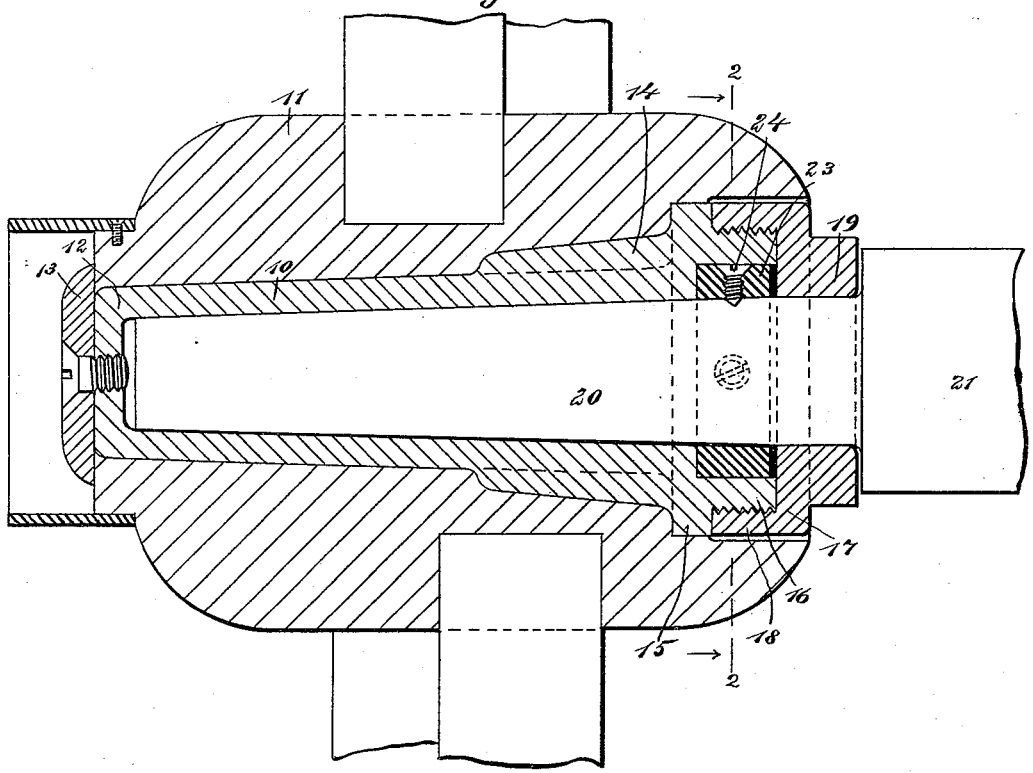
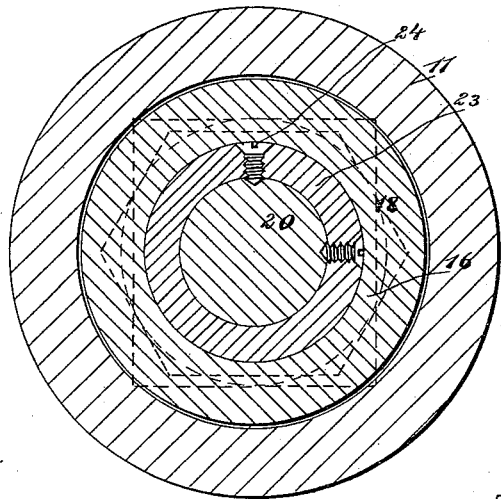
WITNESSES:
J. A. Bergstrom
C. Sedgwick
INVENTOR:
T. J. McGee
BY Munn & Co.
ATTORNEYS

UNITED STATES PATENT OFFICE.

THOMAS J. McGEE, OF HATTIESBURG, MISSISSIPPI.

AXLE-BEARING.

SPECIFICATION forming part of Letters Patent No. 481,911, dated August 30, 1892.

Application filed November 27, 1891. Serial No. 413,264. (No model.)

*To all whom it may concern:*

Be it known that I, THOMAS J. McGEE, of Hattiesburg, in the county of Perry and State of Mississippi, have invented a new and Improved Axle-Bearing, of which the following is a full, clear, and exact description.

My invention relates to improvements in axle-bearings; and the object of my invention is to produce a bearing adapted for all sorts of vehicle wheels and axles which may be cheaply made, which will enable the axle to be kept well lubricated, which will exclude all dirt from the bearing, and which will also prevent the escape of any grease.

To this end my invention consists in an axle-bearing, the construction of which will be hereinafter described and claimed.

Reference is to be had to the accompanying drawings, forming a part of this specification, in which similar figures of reference indicate corresponding parts in both the views.

Figure 1 is a longitudinal section of the bearing, showing its application to a wheel and axle; and Fig. 2 is a cross-section on the line 2 2 in Fig. 1.

The box 10 of the bearing tapers toward its outer end in the usual manner, and it is secured in the hub 11 of the wheel. The box is closed tightly at its outer end, as shown at 12, and to this outer end is secured by means of a screw a fastening-plate 13, which overlaps the outer end of the hub and prevents the displacement of the box.

The box is provided near its inner end with wings or flanges 14 to hold it firmly in the hub, with a shoulder 15, and with a threaded flange 16, which projects inward from the shoulder. This flange 16 is adapted to receive the threaded flange 18 of the nut 17, and this nut has its inner portion 19 squared to receive a wrench; but the nut serves as a collar and turns loosely on the spindle 20 of the axle 21. The box and nut are held in the right position and the box held to the wheel by means of a collar 23, which is shrunk upon the spindle 20 and which is also held to the spindle by means of screws 24. It will be noticed by reference to Fig. 1 that the inner end of the axle-box is annularly recessed, so as to fit nicely upon the collar. A suitable packing is inserted between the collar and the nut 17. The inner end of the hub is recessed, as shown in Fig. 1, so that the projecting flange of the nut 17 may enter it and fit upon the flange 16 of the box. To apply the wheel, the nut 17 is held by a wrench applied to the part 19 and the wheel turned up, so that the box and nut will be firmly screwed together. It will be seen that when the parts are in place no dirt can get within the box and no oil can ooze out so as to injure the hub or collect upon any part of the vehicle.

Having thus fully described my invention, I claim as new and desire to secure by Letters Patent—

1. The combination, with the axle-box closed at its outer end and provided in said closed end with a threaded aperture, of the fastening-plate of greater diameter than said closed end and provided with a retaining-screw entering said aperture, substantially as set forth.

2. The combination, with the axle-box having a closed outer end provided with a threaded aperture and an annular recess in the inner end of the box to receive the axle-collar, of the plate 13, of greater diameter than the closed end of the box, having a screw entering said aperture, and a nut screwed upon the inner threaded end 16 of the box and closing the outer side of the said annular recess, substantially as set forth.

THOMAS J. McGEE.

Witnesses:
W. M. CONNER,
W. L. POLK.